Nov. 23, 1954    J. P. PARULSKI    2,695,152
COOKING UTENSIL HANGER
Filed July 29, 1950
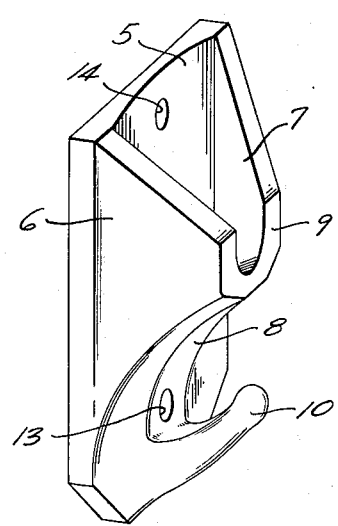
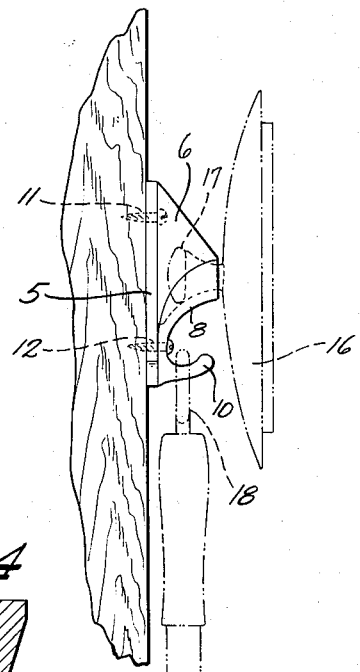
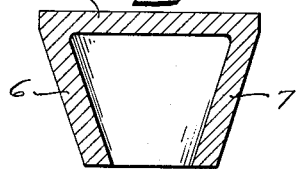
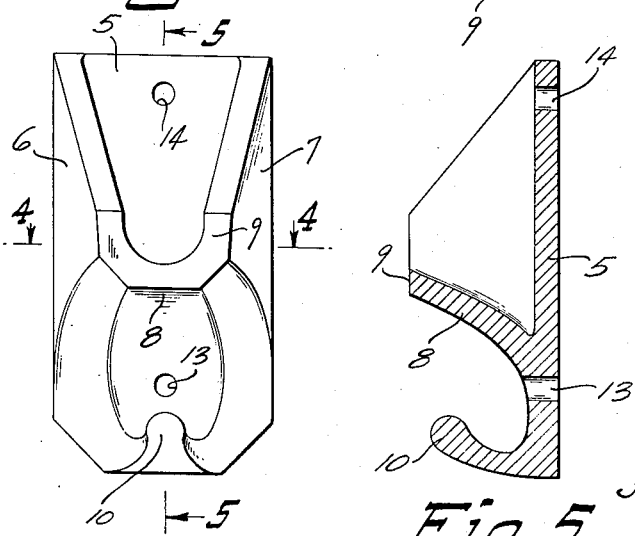
INVENTOR.
Joseph P. Parulski
BY Cyril M. Hajewski
Attorney United States Patent Office 2,695,152
Patented Nov. 23, 1954

2,695,152

COOKING UTENSIL HANGER

Joseph P. Parulski, Milwaukee, Wis.

Application July 29, 1950, Serial No. 176,689

2 Claims. (Cl. 248—314)

This invention relates generally to a hanger and more particularly to a hanger for storing cooking utensils.

It is the general practice today to purchase cooking utensils in sets, in which the various pieces are of the same general design but vary in size and construction depending upon their function. In such sets the several pots and pans are usually each provided with separate covers to be used therewith to increase their efficiency. The housewife who utilizes these utensils, is confronted with the problem of storing them, which is difficult because of their bulk and irregular shape. Normally the covers are placed haphazardly in a drawer and the pots and pans are stacked on a shelf. This method of storage results in the utensils becoming dented and scratched until before long their appearance is greatly depreciated.

It is therefore a general object of this invention to provide an improved hanger for storing cooking utensils.

Another object of this invention is to provide an improved hanger for conveniently supporting a pot or pan and its cover.

Another object is to provide a hanger for supporting cooking utensils for storage so that the utensils will occupy a minimum of space.

Another object is to provide improved means for storing cooking utensils in which the receptacles and their respective covers may be kept together in a neat and orderly manner.

A further object is to provide an improved hanger in which the supports for a cooking receptacle and its cover are integrally formed.

A still further object is to provide a hanger for cooking utensils of simple and inexpensive construction which may readily be mounted on a panel or wall.

According to this invention a hook for hanging a cooking receptacle and a support for its cover are integrally formed to provide a convenient method for storing cooking utensils. The hanger is comprised of an upper hollowed portion with an open top and front. The front opening is of lesser width than the hollow and extends from the top to a point above the bottom of the hollow. The hollow serves to receive the knob of the receptacle cover which is placed therein from the top. The open front of the hollow is narrower than the widest portion of the knob so that it permits the knob with the cover attached to slide into the hollow but prevents it from being withdrawn laterally. The cover is thereby retained in a vertical position by this hollowed portion of the hanger. A forwardly extending hook is formed directly beneath the cover retainer for supporting the cooking receptacle by means of an eye attached to the end of its handle.

The foregoing and other objects of the invention which will become more fully apparent from the following detailed description, may be achieved through embodiment of the invention in an article, such as the exemplifying item depicted in and herein described in connection with the accompanying drawings, in which:

Figure 1 is a perspective view of the cooking utensil hanger;

Figure 2 is a view in side elevation, with a pot and its cover depicted by broken lines in the supported position;

Figure 3 is a detailed view of the hanger in front elevation;

Figure 4 is a view in horizontal section taken along the plane represented by the line 4—4 in Figure 3; and Figure 5 is a detailed view in transverse vertical section taken along the plane represented by the line 5—5 in Figure 3.

Referring now more particularly to the drawings and specifically to Figure 1 thereof wherein is shown an embodiment of the present invention comprising a back plate 5 and two symmetrical side members 6 and 7 projecting angularly from the back plate in converging relationship. The upper surfaces of these side members are inclined downwardly from their point of juncture with the back plate 5 and are joined at their lower extremities by an arcuate bottom portion 8 which extends outwardly and upwardly of the back plate 5.

The narrow ends of the side members 6 and 7 opposite the ends adjoining the back plate 5, are parallel with the back plate to form with the bottom portion 8, a U-shaped front surface 9. Thus, the disposition of the back plate 5, and the side members 6 and 7 with the bottom portion 8, form a cavity of irregular configuration. A horizontal cross section taken through the cavity is of the shape of a truncated triangle as illustrated in Figure 4, with the base formed by the back plate 5. In like manner, a transverse vertical cross section through the cavity as illustrated in Figure 5, approaches the shape of an irregular truncated triangle with the base formed by the vertical back plate 5.

Directly beneath the cavity described, is a projection extending outwardly from the back plate 5 and inclined upwardly to form a centrally disposed hook 10. The hanger is mounted by means of suitable screws 11 and 12 passing through two holes 13 and 14 and threaded into the supporting wall or panel as shown in Figure 2. Although various means for forming the hanger may be utilized, it is preferable that the entire unit be of integral construction, formed by a single casting, for simple and inexpensive manufacture.

In Figure 2 the hanger is depicted mounted on a wall and supporting a cooking receptacle 15 and its associated cover 16, the cooking receptacle and cover being shown by broken lines. The covers of this type are provided with a knob 17 for convenient handling, which is utilized in the present invention for supporting the cover 16. The knobs provided for such covers are normally of circular shape with a large diameter at the top tapering downward to the point of juncture with the cover. Such configuration of the knob 17 is taken advantage of for supporting the cover 16 by inserting the knob in the cavity formed in the hanger.

The knob 17 is inserted in the cavity from the top with its narrowest portion adjacent to the cover, being placed in the vertical opening formed by the U-shaped front surface 9. This opening is of a lesser width than the greatest diameter of the knob 17 to prevent the knob from being withdrawn laterally out of the cavity. As previously stated, the bottom portion 8 of the hanger is inclined downwardly from the front surface 9 to the back plate 5 to accommodate the large diameter of the knob 17 and permit its small diameter to drop into the vertical front opening. With this arrangement, the cover 16 is firmly supported in a vertical position, but readily removable by lifting it upwardly, to raise the knob 17 out of engagement with the cavity through its large top opening.

The cooking receptacle 15 is supported by the hook 10, cooperating with an eye 18 extending from the end of the handle of the receptacle. The eye 18 may be conveniently placed over the hook 10 to support the receptacle 15, before the cover 16 is positioned on the hanger, as the outer diameter of the cover extends beyond the location of the hook. With the receptacle 15 and cover 16 thus supported by the hanger, these two cooperating pieces may be stored together in a neat and orderly arrangement in which they occupy a minimum of space.

From the foregoing detailed description of a practical working embodiment of the invention, it is apparent that there has been provided a useful and convenient cooking utensil hanger of simple and inexpensive construction, which serves to facilitate storage of cooking receptacles and their cooperating covers.

Although but a single embodiment of the invention has been set forth in considerable detail to constitute a full disclosure, it is to be understood that persons skilled in the art may utilize the novel principles here taught in apparatus differing in construction from the particular article herein described, without departing from the spirit and scope of the invention, as defined in the subjoined claims.

The principles of the invention having now been fully explained in connection with the foregoing description of embodying structure, I hereby claim as my invention:

1. A cooking utensil hanger comprising a back plate, a pair of side members extending angularly from said back plate in converging relationship, a bottom element extending upwardly from said back plate at an angle to join the lower ends of said side members, said back plate and side members with said bottom element forming a socket having a frontal slot so that a knob of a cooking receptacle cover may be inserted into the socket to thereby support the cover, and a hook fixed to said back plate beneath said bottom element in position to support a cooking receptacle having a handle by an eye extending from the end of its handle.

2. A cooking utensil hanger for supporting a cooking receptacle having a handle and a cooking receptacle cover having a knob by which it is manipulated, comprising a back plate, a pair of side members extending angularly from said back plate in converging relationship, a bottom element extending upwardly from said back plate at an angle and joining the lower ends of said side members to form a socket having a frontal slot extending downwardly through part of said socket from its top opening to said bottom element, said frontal slot being of a lesser width than the largest diameter of said knob but of a greater width than the smaller diameter of said knob so that the smaller diameter of said knob may be placed into said frontal slot to permit the knob to be inserted into said socket for retention therein to support the cover in a vertical plane, and a hook fixed to said back plate beneath said bottom element in position to support the cooking receptacle beneath said cover by an eye extending from the end of its handle.

References Cited in the file of this patent

UNITED STATES PATENTS

| Number | Name | Date |
|---|---|---|
| 394,792 | Shoe | Dec. 18, 1888 |
| 835,725 | Bollman | Nov. 13, 1906 |
| 926,468 | Christoph | June 29, 1909 |
| 1,394,947 | Singer | Oct. 25, 1921 |
| 2,443,329 | Sears | June 15, 1948 |
| 2,467,997 | Sheker | Apr. 19, 1949 |
| 2,471,825 | Long | May 31, 1949 |
| 2,546,635 | Farkas | Mar. 27, 1951 |
| 2,603,438 | Adams | July 15, 1953 |

FOREIGN PATENTS

| Number | Country | Date |
|---|---|---|
| 959,537 | France | of 1950 |